Patented Nov. 6, 1951

2,574,210

UNITED STATES PATENT OFFICE 2,574,210

METHOD OF PREPARING A HYDROPHILIC CELLULOSE GEL

Jaime Jose Francisco Guardiola-Aragonès, Geneva, Switzerland, assignor to Anglo-International Industries Ltd., Tangier, Morocco No Drawing. Application December 30, 1947, Serial No. 794,783. In Belgium July 26, 1943

Section 1, Public Law 690, August 8, 1946
Patent expires July 26, 1963

6 Claims. (Cl. 260—233)

1

The invention relates to a hydrophilic cellulose gel and to a method of preparing the same.

Cellulose compounds, especially esters and ethers, are known which give more or less extended dispersions, mostly in organic liquid media.

A primary object of this invention is to provide a method for preparing cellulose suitable to form stable dispersions in an aqueous medium.

Another object of the invention is to provide a method for preparing a hydrophilic cellulose gel which in aqueous dispersion or solution does not regenerate the fibrous structure of the cellulosic starting material.

Other objects and advantages will be apparent from a consideration of the specification and claims.

It is known that by soaking cellulose in alkaline solutions of high concentration products are obtained which on washing regenerate the structure of the starting material (mercerized cellulose).

It has now been found that under certain conditions it is possible to impart to cellulose fibers by an alkali treatment a more profound modification of their structure in such a way that the cellulose undergoes a depolymerization and that the obtained product does not regenerate with water the original fibrous structure but forms a gel.

The known methods of ripening cellulose result in the formation of compounds from which it is always possible to regenerate the fibrous structure of cellulose. By the process according to this invention a depolymerization of the cellulose, i. e. the formation of shorter chains, is obtained and this dislocation of the molecular structure is pushed so far that a regeneration of the fiber is no longer possible.

The essential idea of the invention consists in fixing a determined proportion of alkali to cellulose, leaving therein an also determined content of moisture, and in bringing about a depolymerization of the cellulose in such a way as to obtain finally a product jellifiable even in an aqueous medium. The depolymerization may be brought about, for instance, by the use of appropriate catalysts and/or by applying elevated pressures and/or temperatures. The catalyst is preferably used in very small amounts in order to avoid undesirable coloration of the end product.

According to the invention, the process may be carried out as follows:

Cellulose of whatever nature is soaked in an

2 alkaline solution (such as caustic soda, potash, or alkaline carbonates) having preferably a concentration of about 18 to 40 per cent. This solution is maintained at a relatively low temperature for fixing a maximum amount of alkali to the cellulose, the quantity of fixed alkali being reversely proportional to the soaking temperature.

The ratio between the bath employed and the treated cellulose should preferably be about 10 to 1, i. e. 10 parts of bath are used for 1 part of dry material. This proportion is maintained as far as possible throughout the whole process.

The time necessary for the soaking step may vary from 2 to 12 hours, it being understood that the figures given hereinbefore are illustrative and not limitative.

The next step is the removal, preferably by pressure, of the excess of the alkaline solution to such an extent that the pressed material still possesses a moisture content of about 45 per cent.

This product is subjected to a depolymerizing treatment, preferably in the presence of appropriate catalysts and by applying elevated pressures and/or temperatures, for instance in an autoclave. The pressures may vary between about 5 and 10 atm. and the temperatures between about 40 and 70° C. This step will generally take between 2 and 24 hours, dependent on the temperature and pressure applied; it may be carried out in an atmosphere of compressed air, or of oxygen, or of a mixture of air and oxygen in variable proportions. Metal oxides of the Fe-Al group may be employed as catalysts but under favorable conditions the depolymerization may also be obtained without catalysts.

Instead of concentrated alkaline solutions, solid alkali may be used. In this case, cellulose containing a suitable amount of moisture, preferably about 50 to 60 per cent, is treated with solid alkali (caustic soda or potash, alkaline carbonates) in an amount corresponding to about 20 to 30 per cent by weight of the final product. If the cellulose does not contain the required proportion of water, additional water may be added before or during the admixture of the alkali, or it may be brought in with the alkali.

The components of the mixture are thoroughly mixed by means of a suitable apparatus and preferably kept in agitation for a period of about 3 to 6 hours. Since the reaction is exothermic, the temperature is sufficiently raised to bring about the desired depolymerization. It is obvious that the temperature may be adjusted by cooling or supplying additional heat to the mixture.

An advantage of this modification of the process is that a hydrophilic gel of depolymerized cellulose may be obtained in a single step by merely mixing wet cellulose with solid alkali, even without applying pressure, though, of course, pressure may be used and catalysts may be added.

The cellulose gel obtained by the methods described hereinbefore is a colloidal gel which has the outstanding property of not being able to regenerate the fibrous structure of cellulose. This property is valuable since it allows the gel to preserve all its physical characteristics under varying conditions of dispersing medium, pH, reaction and the like. The gel is odorless and is capable of quite thin dispersions with water. The consistency of the gel may vary between wide limits as a function of the amount of water included therein, and the gel may present itself in different physical forms, for instance in the form of soft, fluid, or liquid pastes. Its pH may be adjusted and modified within rather wide limits and the gel may be readily neutralized by adding thereto a substance of acid reaction having an appropriate pH.

The applications of the gel may be manifold, particularly in the field of soaps, tooth pastes, creams, ointments, floor waxes, waxes, and gels for industrial purposes. Its manufacture is very economic.

When dehydrated the new cellulose gel is a translucent material of horny structure which in compact or disintegrated form is suitable for many uses.

The hydrophilic cellulose gel according to this invention is particularly adapted for the use as a carrier material and protective agents for detergents and washing compositions. Over previously used soluble cellulose derivatives such as methyl or ethyl cellulose, cellulose glycolate and the like the cellulose gel according to this invention has the advantage of showing just the right hygroscopicity for the desired purpose. Neither does it act as a mere filler nor become deliquescent in a humid atmosphere or dissolve altogether at the first contact with water. In admixture with foaming agents it forms an excellent non-irritating stable vegetable soap to which any desired pH may be given. The cellulose gel imparts to such compositions a satisfactory resistance against mechanical wear and a too fast dissolution in water and it seems that the depolymerized cellulose reacts in some way with the other components to provide instantaneously an abundant, fatty and stable lather. The composition, when suitably compounded and stored, keeps substantially unchanged over an unlimited period of time and has a considerably higher softening point than a fatty soap.

The invention will now be further described with reference to the following specific examples of the general process. These examples, however, are purely illustrative and are not to be regarded as limitative with respect to the scope of the invention.

*Example 1*

This example will illustrate a method which may be used for preparing cellulosic material for the depolymerizing treatment when not wood pulp or similar pretreated material but wood wastes, straw, or other vegetable raw materials or residues are used.

100 kg. of vegetable fibers are crushed or otherwise disintegrated and treated at room temperature with about 800 to 1000 l. of a solution of caustic soda having a concentration of about 5 to 15 per cent, preferably 6.5 to 10 per cent. After a treatment of about 6 to 10 hours the fibers are separated from the solution containing the non-cellulosic substances, for instance by a hydraulic press. The cellulose cakes may be dried and again disintegrated and are then through into a solution (1000 to 1250 l.) of sodium hypochlorite containing 30 to 40 g. of active chlorine per liter where they are left for a period of about 25 to 40 hours. The fibers are then washed and dried.

*Example 2*

100 kg. of dried cellulose material are brought in a caustic potash lye of about 40% concentration by weight and left therein for about 2 hours at a temperature of about 5° C. The mass is drained and subjected in a hydraulic press to such a pressure that the product contains afterwards about 40% of moisture. The cakes are disintegrated and then subjected in an autoclave to a temperature of about 50° C. and a pressure of about 5 atm. in the presence of a metal oxide catalyst, such as described above, in the amount of 0.001% of the dry material.

*Example 3*

100 kg. of cellulose are dried and immersed in 1000 l. of soda lye of about 30% concentration by weight for a period of about 24 hours; the bath is cooled so as to maintain the temperature at about 5° C. The mass is then drained and subjected in a hydraulic press to such a pressure that the squeezed material still contains about 45% of moisture. The cakes are disintegrated and the product is subjected in an autoclave to a temperature of about 50° C. and an air pressure of about 6 atm. for a period of about 8 hours. The product leaving the autoclave may be directly gelled in water.

*Example 4*

285 kg. of wet cellulose containing 65% of moisture are immersed in a solution of 300 kg. of caustic soda in 665 l. of water for 24 hours while a temperature of about 5° C. is maintained. Then the material is drained and pressed in such a way that the finished product still contains about 45% of humidity. The cakes are disintegrated and then placed in closed metal vessels which are maintained at a constant temperature of about 22.5° C. for a period of 15 days.

*Example 5*

100 kg. of dry cellulose are finely crushed and mixed during 6 hours with a solution of 100 kg. of soda in 185 l. of water. The obtained product is directly placed in an autoclave and subjected to a pressure of 8 atm. in a mixture of air and oxygen at a temperature of about 60° C. for a period of about 16 hours.

*Example 6*

285 kg. of wet cellulose containing about 65% of moisture are mixed with 100 kg. of finely crushed caustic potash. The mixture is agitated in a mechanical apparatus for 6 hours while the temperature is maintained at about 70° C. In this way an hydrophilic cellulose gel is directly obtained which in the presence of water is dispersed to a degree approaching a perfect solution.

*Example 7*

This example illustrates the use of the cellulose gel according to the invention for the preparation of a vegetable soap.

100 kg. of a hydrophilic cellulose gel obtained according to Examples 2 to 6 and containing 18 to 20 per cent of NaOH are mixed with the corresponding amount, for instance 100 to 105 kg., of a foaming agent having a saponification number of 190 to 200. The mix is thoroughly kneaded until the desired pH is obtained; subsequently 40 to 60 kg. of a water-soluble resin and, if desired, 6 to 10 kg. of zinc or titanium oxide, 2.5 kg. of trisodium phosphate, 1 to 2 kgr. of triethanolamine, coloring matter, perfume, and other ingredients are added and the mix is worked up to a paste of the desired consistency. In addition, neutralizing cellulose gel prepared according to this invention may be added, for instance in amounts of 30 to 60 kg.

The amount of the foaming agent used in combination with the cellulose gel depends on the basicity of the gel and the saponification number of the foaming agent. It is easy to neutralize the basic cellulose gel by an acid foaming agent. Suitable foaming agents are for instance sulphonated aromatic cyclic or polycyclic compounds condensed with alcohols having more than three carbon atoms. According to the nature of the starting materials and the desired properties of the foaming agents cellulose gel, obtained according to this invention and neutralized in a suitable manner, may be added either after the sulphonation or during or after the condensation. The temperature is preferably maintained between about 50 and 70° C.

The following examples illustrate the preparation of a foaming agent and its admixture to neutralizing cellulose gel.

Example 8

3.840 kg. of naphthalene are mixed with 22.350 kg. of 92% sulphuric acid. This mixture is brought to a temperature of 50° C. and 300 g. of dried and finely comminuted neutralizing cellulose gel are stirred in in small portions. Then 4.5 kg. of isopropyl alcohol are introduced and the temperature is raised to 70° C. and maintained there for a period of two hours. The separation of the foaming substance is then brought about by decantation.

Example 9

(a) 50 kg. of naphthalene are mixed with 200 kg. of 95% sulphuric acid. 5.3 kg. of neutralizing cellulose gel are added in the manner indicated in Example 8. The mixture is stirred and the temperature is raised to 55° C. and maintained there for half an hour.

(b) Separately a mixture of 45 kg. of isopropyl alcohol with 100 kg. of 95% sulphuric acid is prepared under agitating and cooling.

The cooled down solution (b) is then added to the product of the reaction (a). The admixture has to be carried out slowly and the temperature is maintained at 70° C. for 2 hours, whereupon the obtained foaming agent is decanted as in Example 8.

The water-soluble resin referred to in Example 7 gives to the cellulose gel composition certain complementary qualities and serves particularly to impart plasticity; it facilitates the mechanical working up to a paste and controls the dispersion of the colloidal gel. An admixture of the resin gives lustre to the soap cake and an unctuous feel to the paste.

Among the various water-soluble resins the condensation products of sulphonated aromatic hydrocarbons, partially or wholly neutralized, are particularly adapted to the purposes of this invention. These products may be obtained in the following way:

Example 10

128 kg. of naphthalene are sulphonated at a temperature of 165 to 170° C. by the required minimum quantity of sulphuric acid and then condensed with 41 kg. of 40% formaldehyde at a temperature of 110° C. under vigorous stirring. A resin is obtained which is fluid at the elevated temperature; it is poured portionwise in a high speed revolving mixer which contains milk of lime in an amount sufficient to neutralize the acid resin. The reaction is terminated when the initially brown mass has turned a fine white. The end product is used as such or finely ground after being dried in thin layers and may be added to the mixture of cellulose gel and foaming agents as described in Example 7.

Example 11

128 kg. of naphthalene are sulphonated as described in Example 10 and then condensed with 73 l. of 30% formaldehyde at 110° C. while the mixture is thoroughly agitated. 75 l. of water are added to the hot mixture which is kept being stirred at 100° C. until a homogeneous mixture is obtained. This is neutralized as described in Example 10.

It will be understood that the details given in the foregoing examples of the invention are illustrative and for purpose of guidance only, and that these details may be departed from, for example, in respect of the concentration of the reacting and component materials and the duration and temperature of the various operations within the limits of the attached claims.

What I claim is:

1. A method of preparing a hydrophilic cellulose gel comprising the steps of treating fibrous cellulose material with an alkaline solution of about 18 to 40% concentration, in a proportion of one part by weight of cellulose to at least 3 parts and not substantially more than 10 parts by volume of alkaline solution, at a temperature below about 20° C., removing water in excess of 35 to 45% of the mass, heating the resulting mixture to a temperature of about 40 to 70° C. under elevated pressure and maintaining said elevated temperatures and pressures for a period sufficient to obtain a depolymerized cellulosic gel which does not regenerate the fibrous structure.

2. A method as claimed in claim 1 wherein a small amount of a catalyst selected from the group consisting of ferric oxide, aluminum oxide, and a mixture thereof is added to the mixture and subjected to elevated temperature and pressure.

3. A method as claimed in claim 1 wherein the pressure step is carried out in the presence of a mixture of air and oxygen.

4. A method as claimed in claim 1 wherein the first step is carried out at a temperature of about 5° C.

5. A method as claimed in claim 1 wherein the last step is carried out at a pressure of about 5 to 8 atm.

6. A method of preparing a hydrophilic cellulose gel comprising the steps of mixing wet cellulose gel containing about 45 per cent of water with lulose containing about 45 per cent of water with solid alkali in an amount equivalent to about 30 per cent of the weight of the final product, and maintaining said mixture at a temperature of about 50 to 80° C. for a period of time sufficient to obtain a depolymerized cellulose gel which does not regenerate the fibrous structure.

JAIME JOSE FRANCISCO
GUARDIOLA-ARAGONÈS.

REFERENCES CITED

The following references are of record in the file of this patent:

UNITED STATES PATENTS

| Number | Name | Date |
|---|---|---|
| 1,342,783 | Volz | June 8, 1920 |
| 1,467,107 | Farrow | Sept. 4, 1923 |
| 1,569,692 | Weyenbergh | Jan. 12, 1926 |
| 1,802,575 | Richter | Apr. 28, 1931 |
| 1,831,197 | Richter | Nov. 10, 1931 |
| 1,831,647 | Bassett | Nov. 10, 1931 |
| 1,858,017 | Lilienfeld | May 10, 1932 |
| 1,911,560 | Etzkorn | May 30, 1933 |
| 1,973,491 | Lilienfeld | Sept. 11, 1934 |
| 2,149,310 | Peterson | Mar. 7, 1939 |
| 2,352,021 | Schubert | June 20, 1944 |

OTHER REFERENCES

Ott, "Cellulose and Cellulose Derivatives," 1943, pages 268, 269, 274 to 278, 710, 711, 740/744.